United States Patent [19]
Stricklen et al.

[11] Patent Number: 5,182,330
[45] Date of Patent: Jan. 26, 1993

[54] PROCESS FOR THE COPOLYMERIZATION OF 4-METHYL-1-PENTENE

[75] Inventors: Phil M. Stricklen; Daniel M. Hasenberg; Patrick Rooney, all of Bartlesville, Okla.

[73] Assignee: Phillips Petroleum Company, Bartlesville, Okla.

[21] Appl. No.: 745,021

[22] Filed: Aug. 13, 1991

[51] Int. Cl.$^5$ .......................................... C08F 255/00
[52] U.S. Cl. .................................. 525/247; 525/270; 525/320
[58] Field of Search ............... 525/320, 268, 270, 247; 526/904, 348.4

[56] References Cited

U.S. PATENT DOCUMENTS

| | | | |
|---|---|---|---|
| 3,029,215 | 4/1962 | Campbell et al. | 526/348.5 |
| 3,472,917 | 10/1969 | Bohn et al. | 525/268 |
| 3,489,735 | 1/1970 | Clark et al. | 260/8.2 |
| 3,780,136 | 12/1973 | Khelghatian et al. | 526/903 |
| 3,969,333 | 7/1976 | Nickl et al. | 526/348.5 |
| 4,146,591 | 3/1979 | Fukui et al. | 525/268 |
| 4,659,792 | 4/1987 | Kashiwa et al. | 526/348.4 |
| 4,798,866 | 1/1989 | Yoshitaka et al. | 525/191 |

FOREIGN PATENT DOCUMENTS 0260037 11/1988 European Pat. Off. .

Primary Examiner—Joseph L. Schoefer
Assistant Examiner—David Wu
Attorney, Agent, or Firm—Edward L. Bowman

[57] ABSTRACT

In the copolymerization of 4-methyl-1-pentene and at least one alpha olefin under batch polymerization conditions at a temperature of at least about 50° C. wherein 4-methyl-1-pentene is initially polymerized in the absence of comonomer and then comonomer is added to the reaction vessel to permit copolymer formation, the improvement comprising initially forming 4-methyl-1-pentene homopolymer in an amount sufficient to reduce the solubility of the later formed copolymer at the polymerization temperature, said homopolymer being no more than about 5 weight percent of the end product copolymer. Also the products of such polymerizations are disclosed.

1 Claim, No Drawings

PROCESS FOR THE COPOLYMERIZATION OF 4-METHYL-1-PENTENE

FIELD OF THE INVENTION

The present invention relates to the polymerization of 4-methyl-1-pentene (also referred to herein as 4MP1). More specifically the present invention relates to forming copolymers of 4-methyl-1-pentene with an alpha-olefin comonomer. The present invention is particularly applicable to bulk slurry copolymerizations.

BACKGROUND OF THE INVENTION

Homopolymers of 4-methyl-1-pentene have some properties which are particularly desirable such as transparency. It has been discovered by those skilled in the art, however, that certain properties of such polymers can be improved by incorporating comonomers. Some examples of processes for preparing copolymers of 4-methyl-1-pentene are disclosed in U.S. Pat. Nos. 3,489,735 and 4,146,591, the disclosures of which are incorporated herein by reference.

The homopolymerization and copolymerization of 4-methyl-1-pentene is generally carried out in a batch polymerization process. The term "batch polymerization" is used to refer to a polymerization in which a quantity of the monomers are polymerized in a reaction vessel and then the resulting polymer is recovered from that reaction vessel upon the desired level of polymerization of the monomers. It is also known in the art that it is desirable to carry out such polymerizations under conditions which result in a slurry of particles of the desired polymer or copolymer in the polymerization diluent rather than a solution of the polymer or copolymer. The formation of such a slurry aids in the separation and purification of the resulting polymer.

The present applicants have conducted a large number of batch copolymerizations of 4-methyl-1-pentene copolymers using techniques such as those taught in the art. One of the facts that the applicants have noted in using such prior art disclosed processes is that polymeric materials are formed which dissolve in the polymerization diluent. The presence of the soluble polymeric materials has been noted to often coat the interior of the reaction vessel. If such polymeric materials are allowed to accumulate over successive batches of polymers, the soluble polymer can result in significant reductions in the efficiency of heat transfer in the reactor. Accordingly, in using polymerization processes of the type taught in the prior art, it has been necessary to thoroughly wash the reaction vessel periodically to assure that soluble polymeric material is removed from the reaction vessel before additional batch polymerizations of 4-methyl-1-pentene are conducted.

In addition, the applicants have noted that it becomes increasingly difficult to keep the copolymer in the undissolved particle form as the level of comonomer is increased and as the temperature of polymerization is increased. This phenomena is particularly noticeable when the comonomer is a linear olefin containing 11 carbons or more. Since catalyst activity and thus productivity is directly related to the polymerization temperature it is desirable to carry out such polymerizations at temperatures of at least about 50° C.

Obviously, it would be advantageous to have a process for producing such copolymers of 4MP1 which would minimize the formation of such soluble polymeric material.

An object of the present invention is to provide processes which reduce the amount of soluble polymeric material produced in a batch slurry copolymerization of 4-methyl-1-pentene. Other aspects, objects, and advantages of the present invention will be apparent to those skilled in the art having the benefit of the following disclosure.

SUMMARY OF THE INVENTION

In accordance with the present invention there is provided a process for copolymerizing 4-methyl-1-pentene and at least one alpha olefin under batch polymerization conditions at a temperature of at least about 50° C. wherein 4-methyl-1-pentene is initially polymerized in the absence of comonomer and then comonomer is added to the reaction vessel to permit copolymer formation. Initially 4-methyl-1-pentene homopolymer is produced in an amount sufficient to reduce the solubility of the later formed copolymer at the polymerization temperature, said homopolymer being no more than about 5 weight percent of the end product copolymer.

DETAILED DESCRIPTION OF THE INVENTION

The present invention is considered applicable to the formation of copolymers of 4-methyl-1-pentene with minor amounts of generally any alpha-olefin, i.e. a 1-olefin, which has a faster polymerization rate and with the particular catalyst system than does the 4-methyl-1-pentene. Particularly favored alpha-olefins are the linear 1-olefins having from about 2 to about 18 carbon atoms, more commonly about 5 to about 18 carbon atoms per molecule. Examples of such olefins include 1-pentene, 1-hexene, 1-octene, 1-decene, 1-hexadecene, and the like. It is also within the scope of the present invention to use mixtures of such alpha-olefins. The amount of comonomer employed can vary over a wide range. Typically, however, the comonomer is employed in an amount such that the total amount of comonomer in the resulting polymer would be in the range of about 0.5 to about 20 weight percent, more often about 0.5 to about 10 weight percent. The invention is particularly useful when it is desired to produce copolymers containing more than 2 weight percent of comonomer having 11 or more carbons per molecule.

As is known in the art, it is desirable to carry out 4MP1 copolymerization in a diluent suitable for the formation of a slurry of copolymer. Generally the polymerization is carried out as a bulk polymerization, that is a polymerization in which the 4-methyl-1-pentene is itself used as the liquid diluent for the polymerization. Other liquids under certain circumstances could also be employed in place of or in addition to 4MP1, examples of such liquids include petroleum ether, a petroleum fraction boiling between 180° C. and 220° C., and linear alkanes such as n-decane and n-heptane.

The catalyst system employed for the polymerization can be selected from any known catalyst system which is capable of producing an insoluble copolymer of 4-methyl-1-pentene. Such catalysts are generally referred to in the art as stereospecific catalysts, that is catalysts which are known to be capable of producing large amounts of hydrocarbon insoluble polymer. Some examples of such catalyst systems are disclosed in U.S. Pat. Nos. 3,489,735; 4,146,591; and 4,798,866, the disclosures of which are incorporated herein by reference.

The currently preferred catalyst system is the combination of a dialkylaluminum halide in combination with titanium trichloride. The dialkylaluminum chloride is generally referred to as a cocatalyst and the titanium trichloride component is generally referred to as the catalyst. Various compositions containing titanium trichloride are known in the art as being suitable for use in stereospecific catalyst systems for olefins such as 4-methyl-1-pentene or propylene. Generally, any of those titanium trichloride-containing catalysts are considered to be suitable for the present invention.

The particular reaction conditions employed can vary over a wide range depending upon the particular results desired. As a general rule, it is desirable to carry out the polymerization in the absence of air and water or in the presence of only limited amounts of air or water since both deactivate the catalyst. Nitrogen is often used to purge the reaction vessel before polymerization. Typically the polymerization pressure is in the range of from about atmospheric to about 500 psi, more commonly from about atmospheric to about 50 psi.

The polymerization temperature can range over a wide range. The present invention applies when the polymerization temperature is at least about 50° C. Typically, temperatures in the range of about 50° to 90° C. would be used. Generally lower temperatures are needed for higher molecular weight comonomers. Preferably, the initial 4MP1 homopolymer and the end product copolymer both have a viscosity of less than 2.5 dl/g as measured in tetralin at 135° C. using a Ubbelohde viscometer.

A further understanding of the present invention and its objects and advantages will be provided by the following Examples.

EXAMPLE 1

A stainless steel reactor having a volume of 115 liters which had been purged with nitrogen was charged 50 kg of 4MP1, 4.97 g of titanium trichloride catalyst, 30.0 g of diethylaluminum chloride cocatalyst, and 4.69 moles of hydrogen. After fifteen minutes 1000 g of 1-decene was added.

Samples were taken from the reactor at 15 minute intervals beginning at the time the reactor reached 50° C. The data for samples taken during the run are shown in Table 1.

TABLE 1

Samples Taken For Example 1

| Time | % Conversion | Mole % Comonomer in the Polymer | Wt. % of the Polymer in Solution |
| --- | --- | --- | --- |
| 0 | 2.16 | 0 | 1.67 |
| 15 | 4.93 | 0 | 1.50 |
| 30 | 8.00 | 1.12 | 2.00 |
| 45 | 13.4 | 2.00 | 1.78 |
| 60 | 17.3 | 2.48 | 1.30 |
| 90 | 23.7 | 2.47 | 1.21 |
| 120 | 30.5 | 2.23 | 0.93 |

The percentage of polymer in solution stayed very low with this procedure but the comonomer content in the copolymer peaked before the end of the run and had begun to decrease.

EXAMPLE 2

A stainless steel reactor having a volume of 115 liters which had been purged with nitrogen was charged 50 kg of 4-methyl-1-pentene, 640 grams of 1-decene, 5.26 g of titanium trichloride catalyst, 30.0 g of diethylaluminum chloride cocatalyst, and 4.69 moles of hydrogen. The contents were stirred and brought to 50° C. The total polymerization time was 120 minutes. A solution of propylene oxide and acetylacetone was added to terminate the polymerization reaction and to make the deactivated catalyst soluble in the liquid monomer. The polymer was filtered and washed twice with n-heptane to remove the catalyst residues. The polymer was dried and stabilized with 0.1 wt. % Irganox 1010, 0.2 wt. % DLTDP, and 0.04 wt % zinc stearate. The polymer fluff was pelletized and injection molded into parts which were tested for mechanical properties. The properties are recorded in Table 2. Samples were taken at intervals through the run. The analysis of those samples are shown in Table 2.

TABLE 2

Samples Taken for Example 2

| Time | % Conversion | Mole % Comonomer in the Polymer | Wt. % of the Polymer in Solution |
| --- | --- | --- | --- |
| 0 | 2.52 | 3.68 | 17.5 |
| 15 | 6.05 | 3.25 | 5.49 |
| 30 | 9.61 | 2.93 | 5.24 |
| 60 | 15.52 | 2.76 | 4.25 |
| 90 | 21.74 | 2.31 | 3.50 |
| 120 | 26.85 | 2.18 | 3.28 |

EXAMPLE 3

A stainless steel reactor having a volume of 115 liters which had been purged with nitrogen was charged with 50 kg of 4-methyl-1-pentene, 5.06 g of titanium trichloride catalyst, 30.0 g of diethylaluminum chloride cocatalyst, and 5.36 moles of hydrogen. The contents were stirred and brought to 50° C. When the reaction mixture temperature reached 50° C., 2000 g of 1-decene was added at one time. After 1 hour, the viscosity of the reaction mixture became to high to have effective stirring due to the high level of dissolved polymer. The reaction was terminated with propylene oxide and acetylacetone. The polymer which was isolated had a molar decene content of 3.93%. This illustrates that even with a slightly delayed addition of the comonomer, if the crystallinity is too low, the polymer can go into solution.

EXAMPLE 4

A stainless steel reactor having a volume of 115 liters which had been purged with nitrogen was charged 50 kg of 4-methyl-1-pentene, 4.20 g of titanium trichloride catalyst, 30.0 g of diethylaluminum chloride cocatalyst, and 4.5 moles of hydrogen. The contents were stirred and brought to 50° C. After the contents had been at 50° C. for 10 minutes, 1800 g of 1-hexadecene was added at one time. The copolymerization was continued for another 140 minutes, at which time the catalyst was deactivated by adding a solution of propylene oxide and acetylacetone. The copolymer produced contained 2.01 mole % hexadecene. At the end of the run, 3.23 wt. % of the polymer was in solution.

EXAMPLE 5

Example 4 was reproduced except that at 5 minutes into the run, 2000 g of 1-hexadecene was added to the reactor. After 60 additional minutes of polymerization time, another 1000 g of 1 hexadecene was added. The copolymer was filtered and washed. The copolymer contained 2.83 mole % hexadecene. The wt % of polymer in solution during the run varied from 6 to 15%.

EXAMPLE 6

A stainless steel reactor having a volume of 115 liters which had been purged with nitrogen was charged with 50 kg of 4-methyl-1-pentene, 2000 g of 1-hexadecene, 4.05 g of titanium trichloride catalyst, 30.0 g of diethylaluminum chloride cocatalyst, and 4.5 moles of hydrogen. The contents were stirred and brought to 50° C. After the reaction had been going for 30 minutes, an additional 750 g of 1-hexadecene was added. At this point it was discovered that the copolymer had gone into solution and the reaction was terminated.

EXAMPLE 7

A 4 liter stainless steel reactor which had been purged with nitrogen was charged with 2000 g of 4-methyl-1-pentene, 43.1 g of 1 hexadecene, 0.168 g titanium trichloride, 0.7 g of diethyaluminum chloride, and 0.085 mole of hydrogen. The reactor was sealed and brought to 50° C. with stirring. The contents were held at 50° C. for 1 hour. At the end of one hour, 10 mLs of methanol was charged to the reactor to deactivate the catalyst. The copolymer produced contained 2.87% hexadecene and 15.27% of that material was in solution.

EXAMPLE 8

Comparative Example 7 was repeated except that 53.2 g of 1 hexadecene was added to the reactor. The copolymer produced contained 3.22% hexadecene and 27.63% of the copolymer was in solution.

EXAMPLE 9

Comparative Example 7 was repeated except that 61.8 g of 1-hexadecene was added to the reactor. In this case, all of the polymer went into solution.

Comparative Examples 7, 8, and 9 show that copolymers of 1-hexadecene can be made, with high solubles, up to certain comonomer content, beyond which, the polymer goes into solution.

That which is claimed is:

1. In a batch particle form polymerization of 4-methyl-1-pentene and at least one other alpha-olefin in a polymerization liquid diluent consisting essentially of 4-methyl-1-pentene, the improvement comprising
    (1) charging 4-methyl-1-pentene, catalyst, and cocatalyst to the polymerization vessel, wherein said catalyst consists essentially of titanium trichloride and said cocatalyst consists essentially of a dialkylaluminum halide,
    (2) carrying out homopolymerization of 4-methyl-1-pentene to form 4-methyl-1-pentene homopolymer in an amount sufficient to reduce the solubility of the later formed copolymer in the polymerization liquid diluent during polymerization,
    (3) adding comonomer to the polymerization vessel while polymerization continues,
    (4) and continuing polymerization to form said copolymer, said polymerizations being conducted at a temperature of at least about 50° C. and the amount of homopolymer formed in (2) being no greater than about 5 wt. percent of the end product copolymer.

* * * * *